J. VON BRETHORST.
TRACTOR HITCH.
APPLICATION FILED MAR. 29, 1917.
1,235,082.  Patented July 31, 1917.
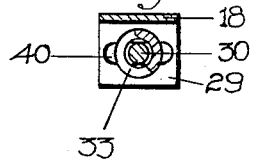
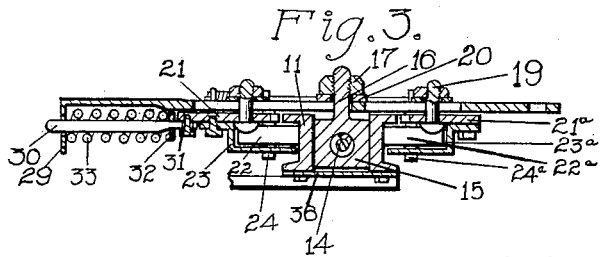
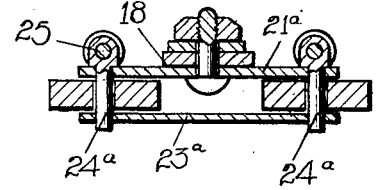
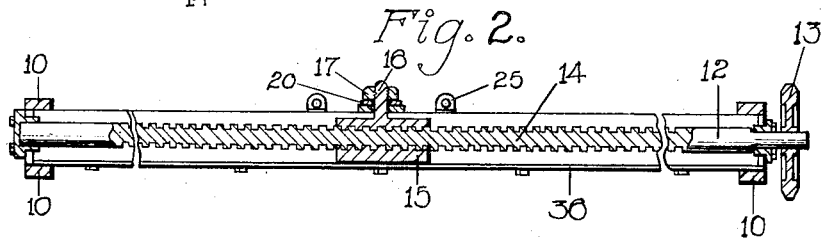
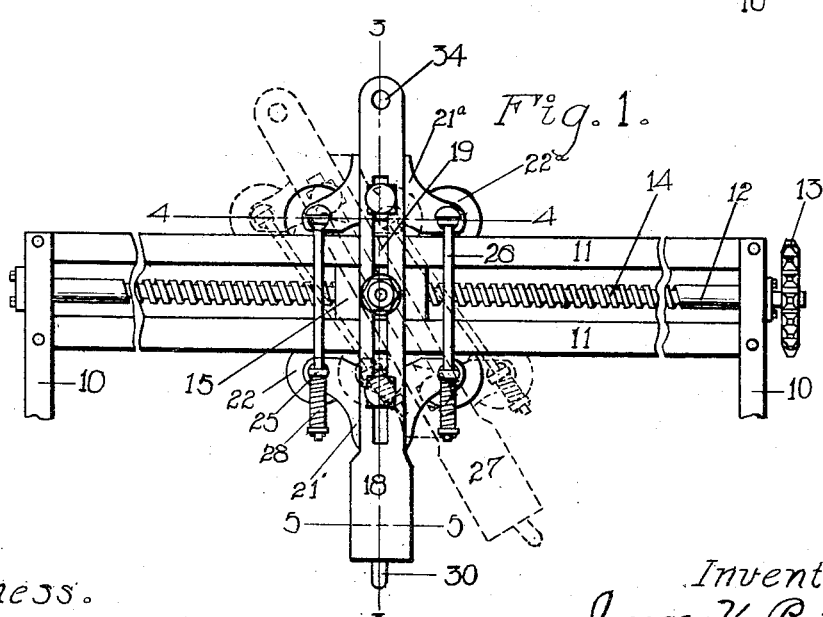
Witness.
Hal H Hyland.
Inventor.
Joergen Von Brethorst.
By Orwig & Bair Attys.

UNITED STATES PATENT OFFICE.

JOERGEN von BRETHORST, OF WEBSTER CITY, IOWA.

TRACTOR-HITCH.

1,235,082.  Specification of Letters Patent.  Patented July 31, 1917.

Application filed March 29, 1917. Serial No. 158,446.

*To all whom it may concern:*

Be it known that I, JOERGEN VON BRETHORST, a citizen of the United States, and resident of Webster City, in the county of Hamilton and State of Iowa, have invented a certain new and useful Tractor-Hitch, of which the following is a specification.

The object of my invention is to provide a tractor hitch of simple, durable and inexpensive construction.

A further object is to provide a tractor hitch adapted to be used in connection with a traction engine for hitching a load behind said engine, said hitch having adjustable parts for permitting considerable adjusting movement between the load and the tractor.

A further object is to provide a tractor hitch which may be attached across the rear end of a tractor or the like, and may be adjusted transversely to any position by a screw or the like, which may be operated by a hand-wheel located within easy reach of the engineer or by a controllable clutch, and drive mechanism from the engine.

A further object is to provide such a hitch so arranged as to permit lateral movement of the load with the imposition of minimum twisting strain on the hitch.

A further object is to provide such a hitch having parts capable of adjustment with relation to the tractor, and having parts capable of automatic swinging lateral adjustment in addition to such first adjustment.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a tractor hitch embodying my invention.
Fig. 2 shows a vertical, sectional view through the hitch.

Fig. 3 shows a vertical, sectional view, taken on the line 3—3 of Fig. 1.

Fig. 4 shows a vertical, sectional view, taken on the line 4—4 of Fig. 1, and Fig. 5 shows a vertical, sectional view taken on the line 5—5 of Fig. 1.

In the illustration of my invention shown in the accompanying drawings, I have used the reference numeral 10 to indicate two of the longitudinal frame members of the tractor. Secured to and connecting the frame members 10, which are spaced from each other as shown, are spaced transverse frame members 11.

Rotatably mounted between the frame members 11 and preferably supported on the frame members 10, is a shaft 12 spaced from the respective frame members 11 and having on one end, preferably outside the frame members 10, a gearing device 13 whereby power may be applied for rotating the shaft 12. The central portion of the shaft 12 is screw-threaded, as shown at 14.

The frame members 11 preferably have the form of outwardly opening channels, as shown clearly in Fig. 3. Slidably mounted between the frame members 11 is a block 15 having a screw-threaded opening to receive the screw-threaded portion 14 of the shaft 12. It will be seen that by rotating the shaft 12 the block 15 will be slid laterally in the machine.

Extending upwardly from the block 15 is a bolt 16, the upper portion of which is screw-threaded to receive a nut 17.

Resting above the members 11 and extending fore and aft in the machine is a bar 18, having in its central portion a longitudinally elongated slot 19 in which is received the bolt member 16. The sides of the bar 18 are connected by a transverse member 20, as shown in Fig. 3, to prevent their separating, said transverse member being so located as not to interfere with the longitudinal sliding movement of said bar 15.

Below the bar 18 and in front of the forward frame member 11 is a bracket 21 having portions extending laterally from the bar 18 and rotatable supporting rollers 22 which travel in the forward channel, as shown in Fig. 3.

Supported on each bracket 21 is a housing 23 which extends to position below the adjacent rollers 22 and forms bearings for the lower ends of the shafts 24 of such rollers. The bracket 21 is mounted on the bar 18 by means of a bolt which extends upwardly through the opening 19 in the bar 18, as shown in Figs. 1 and 3.

Below the bar 18 and in the rear of the rearward frame member 11 is a similar bracket 21ª having laterally extending ends and supporting rollers 22ª which travel in the rear channel-shaped frame member 11, as shown in Fig. 3. Secured to the bracket 21ª is a housing 23ª extending to position below the rollers 22ª and forming bearings for the lower ends of the shafts 24ª of the rollers 22ª. The upper ends of the shafts 24ª and 24 extend upwardly above the respective brackets 21ª and 21, and have formed on their upper ends eyes 25. A bolt 26 is extended through each of the rearward eyes 25, and forwardly in the machine through the opposite forward eye 25, as shown in Fig. 1. On the forward end of each bolt 26 is a nut or the like 27. Between each nut 27 and the adjacent eye 25 is a coil spring 28.

At the forward end of the bar 18 is a downwardly extending flange 29. Slidably mounted in the flange 29 is a bar 30, shown in Fig. 3, the rear end of which is secured to the bracket 21 at 31. On the bar 30 near the bracket 21 is a collar 32. Between the collar 32 and the flange 29 is a powerful coil spring 33.

The rear end of the bar 18 has a hole 34 to which a clevis may be secured for hitching a wagon or cultivating machine or the like to a tractor. Secured to the lower surfaces of the frame members 11 is a plate 36.

In the practical use of my improved tractor hitch it will be understood that the members 10 form a part of the tractor. The load is hitched to the rear end of the bar 18. The rearward draft of the load or the forward pull of the tractor tends to force the flange 29 against the spring 33. The collar 32 then engages the bracket 21 and the rollers 22 by their engagement with the forward frame member 11, take the load that is being pulled.

It will be noted that there is some resiliency to the hitch at all times on account of the use of the spring 33. If during the advance of the tractor there should tend to be some lateral movement of the load with relation to the tractor, it will be seen that the rear end of the bar 18 may swing laterally, for instance, to the position shown by dotted lines in Fig. 1, whereupon the rods 26 will slide rearwardly through the forward eyes 25, contracting the springs 28. The springs 28 will hold the rollers 27ª always in snug engagement with the rear frame member 11, and will tend to move the rear end of the bar 18 to position where said bar 18 extends directly fore-and-aft in the machine. Any side swing of the rear end of the bar 28 will not impose any fore-and-aft pull on the parts of the hitch which are not intended to bear such strain.

It will readily be seen that if it is desired to shift the position of the load laterally with relation to the tractor, the tractor hitch may be adjusted by rotating the shaft 12 for shifting the block 15 laterally of the tractor. It should be mentioned in this connection that the opening 40 in the flange 29 through which the bar 30 extends is laterally elongated, as illustrated in Fig. 5, to permit the adjustment of the parts to such positions, for instance, as illustrated by dotted lines in Fig. 1.

Some changes may be made in the construction and arrangement of the various parts of my improved tractor hitch without departing from the essential features and purposes of my invention, and it is my intention to cover by the claims of the patent to be issued upon my application, any modified forms of structure or use of mechanical equivalents which may be reasonably included within the scope of my claims.

I claim as my invention:

1. In a device of the class described, a pair of parallel transverse frame members designed to be mounted on the frame of a tractor or the like, a shaft rotatably mounted between said frame members, the central portion of said shaft being screw-threaded, a block mounted on said screw-threaded portion and adapted to slide between said frame members when said screw-threaded portion is rotated, a bar extending across said frame members fore-and-aft of the device, and mounted for longitudinal sliding and pivotal movement on said block, brackets in front of and in the rear of said frame members, means for slidably and pivotally mounting said bar on said brackets, means for yieldably connecting the forward bracket with said bar, and means for slidably and yieldably connecting the rearward and forward brackets.

2. In a device of the class described, a pair of parallel transverse frame members designed to be mounted on the frame of a tractor or the like, a shaft rotatably mounted between said frame members, the central portion of said shaft being screw-threaded, a block mounted on said screw-threaded portion and adapted to slide between said frame members when said screw-threaded portion is rotated, a bar extending across said frame members fore-and-aft of the device, and mounted for longitudinal sliding and pivotal movement on said block, brackets in front of and in the rear of said frame members, means for slidably and pivotally mounting said bar on said brackets, means for yieldably connecting the forward bracket with said bar, means for operatively connecting the rearward and forward brackets, for permitting their lateral sliding movement in relatively different directions.

3. In a device of the class described, a pair of parallel transverse frame members designed to be mounted on the frame of a tractor or the like, a shaft rotatably mounted between said frame members, the central portion of said shaft being screw-threaded, a block mounted on said screw-threaded portion and adapted to slide between said frame members when said screw-threaded portion is rotated, a bar extending across said frame members fore-and-aft of the device, and mounted for longitudinal sliding and pivotal movement on said block, brackets having rollers for engaging said frame members in front and rear, means for slidably and pivotally mounting said bar on said brackets, means for yieldably connecting the forward bracket with said bar, means for slidably and yieldably connecting the rearward and forward brackets, and for yieldingly pressing the rollers of the respective brackets toward said frame members.

Des Moines, Iowa, March 10, 1917.

JOERGEN von BRETHORST.

Copies of this patent may be obtained for five cents each, by addressing the "Commissioner of Patents, Washington, D. C."